United States Patent
Mathews

(10) Patent No.: US 10,096,046 B2
(45) Date of Patent: Oct. 9, 2018

(54) WEB-BASED USER SUPPORT SYSTEM AND METHOD

(76) Inventor: Garrett Wade Mathews, Canton, GA (US)

( * ) Notice: Subject to any disclaimer, the term of this patent is extended or adjusted under 35 U.S.C. 154(b) by 0 days.

(21) Appl. No.: 13/446,993

(22) Filed: Apr. 13, 2012

(65) Prior Publication Data
US 2012/0324375 A1 Dec. 20, 2012

Related U.S. Application Data

(60) Provisional application No. 61/475,602, filed on Apr. 14, 2011.

(51) Int. Cl.
- *G06F 3/00* (2006.01)
- *G06Q 30/06* (2012.01)
- *G06F 17/30* (2006.01)

(52) U.S. Cl.
CPC ... *G06Q 30/0601* (2013.01); *G06F 17/30861* (2013.01)

(58) Field of Classification Search
CPC ............ G06F 17/3089; G06F 11/3438; G06F 11/3476; G06F 17/30861; G06F 2201/875; G06Q 30/02; G06Q 30/0201; G06Q 30/0226; G06Q 30/0255; G06Q 20/12
USPC ........................................................ 715/760
See application file for complete search history.

(56) References Cited

U.S. PATENT DOCUMENTS

| | | | |
|---|---|---|---|
| 5,941,957 A | 8/1999 | Ingrassia, Jr. et al. | |
| 6,914,899 B2 | 7/2005 | Siegrist et al. | |
| 7,660,816 B2 * | 2/2010 | Benson | H04L 67/02 707/999.102 |
| 7,970,664 B2 * | 6/2011 | Linden | G06Q 30/02 705/26.1 |
| 2008/0189424 A1 * | 8/2008 | Maddox | G06F 17/30867 709/227 |
| 2009/0112687 A1 * | 4/2009 | Blair | G06Q 30/02 705/7.29 |
| 2009/0164776 A1 * | 6/2009 | Tuoriniemi | G06F 21/10 713/158 |
| 2009/0235187 A1 * | 9/2009 | Kim | G06F 17/30905 715/760 |
| 2010/0280902 A1 * | 11/2010 | Pang | G06Q 30/02 705/14.54 |
| 2011/0161085 A1 * | 6/2011 | Boda | G06Q 30/02 704/260 |

\* cited by examiner

*Primary Examiner* — Di Xiao
(74) *Attorney, Agent, or Firm* — Kristofer E. Elbing

(57) ABSTRACT

Disclosed, in one general aspect, is a method of interacting with website users that includes serving website pages during a first web browsing session, and tracking a users' interactions with these pages. A verbal communication session, such as a phone call, is initiated from the user's location to a user support location during the web browsing session. A session id is received from the user at the user support location during the communication session. At the user support location both stored tracking information as well as additional information relating to the user can then be accessed based on the received session id. During the communication session, a customer service representative can also serve custom-selected content from a set of browsable website pages into the series of user-selected web pages in the browsing session.

25 Claims, 9 Drawing Sheets

| DateTime 05/09/2014 13:42 | SystemID 5415465181 | SessionID I8odsafd5d154ds12 | LastAccessTime 05/09/2014 14:08 | IPAddress XXX.XX.XX.XXX |

Fig. 3

| SessionID | PageView | AccessTime |
|---|---|---|
| l8odsafd5d154ds12 | Index Page | 05/09/2014 13:42 |
| l8odsafd5d154ds12 | Product XYZ | 05/09/2014 13:44 |
| l8odsafd5d154ds12 | Product ABC | 05/09/2014 13:50 |
| jksi9dsu8y7adlkdk4 | Product Category A | 05/09/2014 11:30 |
| jksi9dsu8y7adlkdk4 | Product EFG | 05/09/2014 11:33 |

Fig. 4

| CustomerID | SystemID | Date |
|---|---|---|
| 123456789 | 5415465181 | 05/09/2014 13:42 |
| 123456789 | 1245165725 | 04/21/2014 8:13 |
| 123456789 | 3111577821 | 08/18/2013 12:02 |
| 123456789 | 2226481242 | 12/10/2014 19:42 |

Fig. 5

WEB-BASED USER SUPPORT SYSTEM AND METHOD

This application claims the benefit under 35 U.S.C. 119(e) of U.S. provisional application No. 61/475,602 entitled WEB-BASED USER SUPPORT SYSTEM AND METHOD filed on Apr. 14, 2011, which is herein incorporated by reference.

FIELD OF THE INVENTION

This invention relates to methods and apparatus for providing support in web-based interactions, such as interactions between e-commerce web site operators and their customers.

BACKGROUND OF THE INVENTION

Customers, potential customers, and other users are increasingly using the internet to gather information about a company's products and services. With this increased use, more customers, or potential customers, are on the company's web site when they contact representatives of the company to ask questions about their products and services. Presently, companies continue to handle phone-call based customer interactions predominantly through direct back and forth verbal exchange of even the most basic information such as name and address info (both physical and email), phone numbers, product item numbers, etc. Questions about products often require the user and the representative to communicate back and forth in order to determine the appropriate product number identifier before the representative can be of help. Or when a customer contacts a support representative shortly after placing an order online, to help the customer, the representative often must first inquire and receive information such as an order number, or a phone number, or a last name and zip code in order to find the customer's order.

SUMMARY OF THE INVENTION

In one general aspect, the invention features a method of interacting with website users that includes serving website pages during a first web browsing session, and tracking a users' interactions with these pages. A verbal communication session, such as a phone call, is initiated from the user's location to a user support location during the web browsing session. A session id is received from the user at the user support location during the communication session. At the user support location both stored tracking information as well as additional information relating to the user can then be accessed based on the received session id. During the communication session, a customer service representative can also serve custom-selected content from a set of browsable website pages into the series of user-selected web pages in the browsing session.

In preferred embodiments, different system ids can be tracked for the first user and the step of accessing the stored further information can include accessing information for a different system id than is used for the step of tracking. The step of tracking can be performed using a session persistence mechanism combined with associations between session information from the session persistence mechanism and a system. The session persistence mechanism can employ cookies. The step of accessing the further stored information can include accessing at the user support location during the communication session information received from the user during at least one earlier web browsing session. The step of accessing information received from the user can access demographic information. The step of accessing the further stored information can include accessing at the user support location during the communication session information received from at least one third party about the user. The method can further include the step of loading information from the user support location on at least one of the website pages during the communication session. The step of loading can include loading shopping cart content information. The step of initiating can include initiating an on-line chat session as the verbal communication session, and the step of receiving an id can receive a machine-readable version of the session id. The step of initiating can include initiating a telephone session as the verbal communication session. The method can further include the steps of prompting users for user information, storing prompted user information received from users in response to the step of prompting in a database for a plurality of users, with the step of accessing the stored further information including accessing the stored prompted information. The of prompting users can include prompting at least some users via hypertext data entry controls, prompting at least some users via paper forms, and prompting at least some users via telephone. The step of prompting users can include prompting at least some users for registration information. The step of prompting users can include prompting at least some users for personal identification information.

In another general aspect, the invention features a system for interacting with website users, which includes user web page generation logic including logic operative to load each of a plurality of user browsers each at a different user location with: a plurality of offered product pages, a session identifier display field with a session identifier, and session persistence management logic operative to track unique sessions. The system also includes user information storage including: session history storage for storing user history information about a plurality of session history entries for each of the plurality of users, and prompted user information storage for storing user information received in response to prompting. Further included is a user support representative terminal at a user support location remote from the user locations comprising: a session identifier entry tool, user browsing session display logic responsive to the session history storage, session history information display logic responsive to the session history storage, stored user information display logic responsive to the user information storage, and a communication channel between at least one of the user browser locations and the user support location.

In a further general aspect, the invention features a method of interacting with website users that includes serving during a web browsing session a series of user-selected web pages that include content that belongs to a set of browsable website pages, tracking a first of the users' interactions with the series of website pages, initiating a verbal communication session between a location of the first user and a user support location initiated from the location of the first user during the web browsing session, receiving at the user support location a session id from the first user during the communication session, and serving custom-selected content from the set of browsable website pages into the series of user-selected web pages in the browsing session from the user support location during the communication session.

In preferred embodiments, the step of serving custom-selected content can include loading shopping cart content information into a shopping cart page of the website for the user. The step of initiating can include initiating an on-line chat session as the verbal communication session, and the step of receiving an id can receive a machine-readable version of the session id. The step of initiating can include initiating a telephone session as the verbal communication session. The step of loading can include loading at least one selected browsable page from the website into the user's browser for viewing. The method of interacting can further include the step of loading a completely custom page into the user's browser for viewing.

Systems according to the invention can leverage the connection of the customer's web enabled devices to customer databases to allow for expedited and more valuable customer interactions with support representatives. This can empower support representatives with a larger amount of customer specific-information than has generally been available. The ability to see what the customer is observing on the web in concert with access to the customer's prior web browsing history and other stored customer information creates an opportunity to increase revenue, efficiency, and/or customer satisfaction from each interaction.

Systems according to the invention can also allow for the introduction by a customer service representative during a call of content into a series of browsable web pages, such as by introducing items into a shopper's cart or pushing an existing browsable product page to a user's browser. This can provide a significantly more rewarding customer service experience to the user than might otherwise be available from a small chat window.

BRIEF DESCRIPTION OF THE DRAWING

FIG. 3 is a diagram showing a database table containing web site access data for use with the system of FIG. 1;

FIG. 4 is a diagram showing a web session log for use with the system of FIG. 1;

FIG. 5 is a diagram showing the relation of the customer identification number to multiple web-enabled device unique identifiers (system IDs) for use with the system of FIG. 1;

DETAILED DESCRIPTION OF AN ILLUSTRATIVE EMBODIMENT

Figure 1:
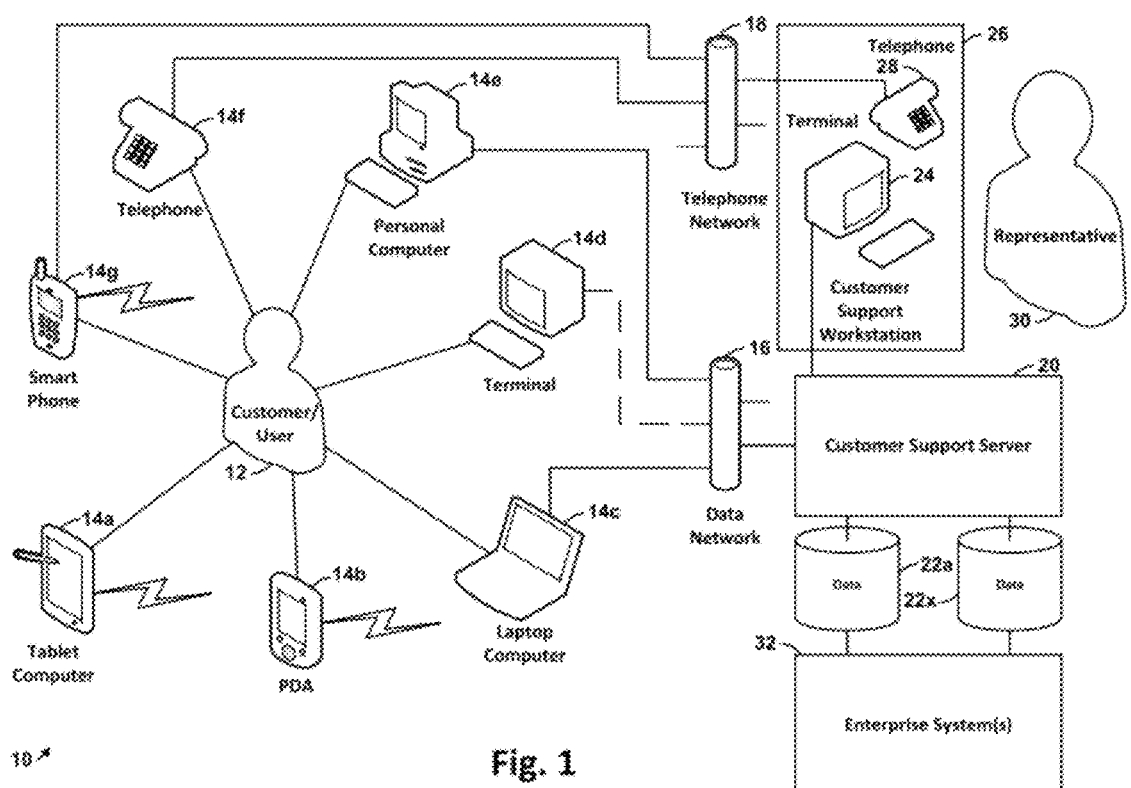
FIG. 1 is a block diagram of an illustrative customer support system according to the invention.

Referring to FIG. 1, an illustrative system 10 according to the invention can provide support to a customer or prospect 12 who uses one of many different devices that are connected to a data network 16, such as the internet, either directly or wirelessly. This support may be provided in connection with a call made over telephone lines 18 or other verbal communication channels, such as via internet chat or text messaging.

More specifically, a customer support server 20 interacts with applications, such as browsers, running on the network-connected devices 14*a-g* using standards such as the Hypertext Markup Language (HTML) and Hypertext Transfer Protocol (HTTP) World Wide Web standards. The server is also connected to one or more data storage units 22*a*-22*x*, such as databases, which may also be accessed by other enterprise system(s) 32. In one embodiment, a first storage unit stores web log data resulting from tracking web activity while a second stores customer information provided to the enterprise by customers, such as in response to prompting by phone, in forms on the web, or in writing.

The customer support server connects to one or more customer support terminals 24 each located at a customer support workstation 26, and can provide data about customers and their browsing history for use by customer support representatives 30. Preferably, the customer support terminals or computers can also allow the user to synchronize with and even interact with a customer's web session. The customer support workstations preferably also include a telephone 28 or other verbal communication device (e.g., a VOIP-enabled headset, a chat application, or an SMS text messaging system).

Figure 2:
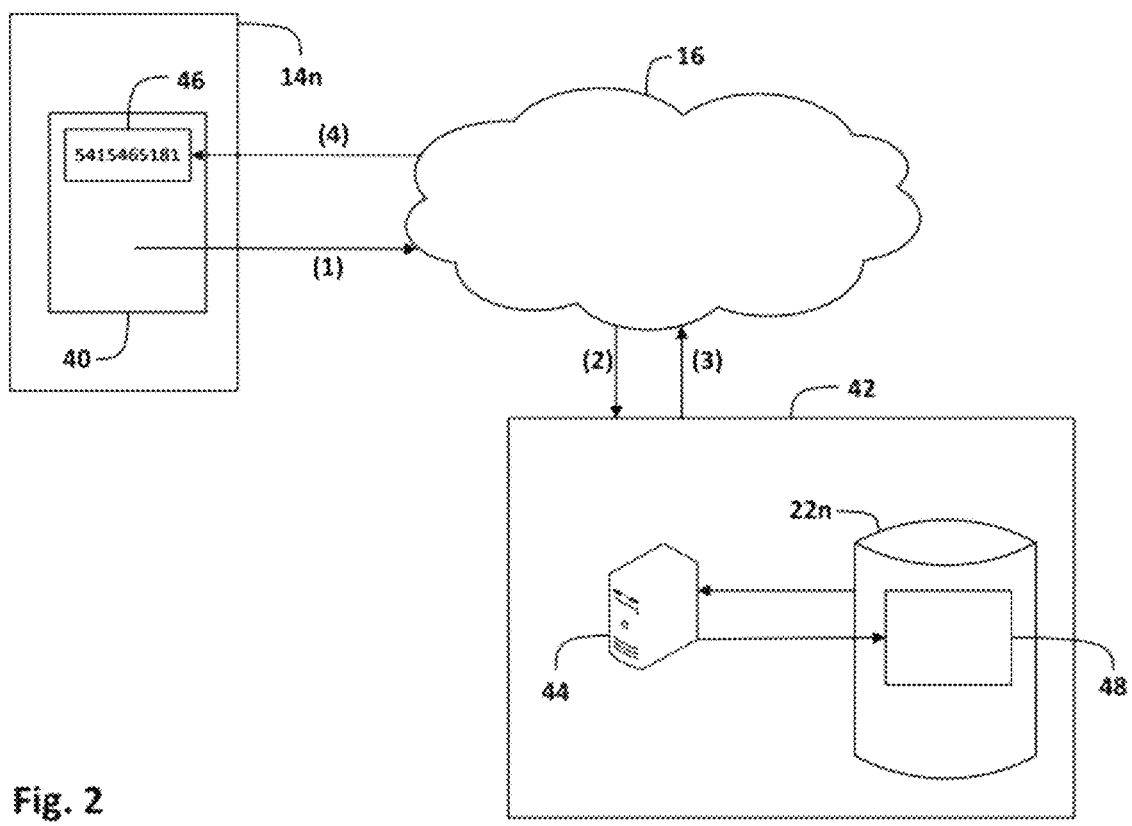
FIG. 2 is a block diagram showing a single customer web enabled device interaction with a website, such as an e-commerce website, during operation of the system of FIG. 1.

Referring to FIG. 2, a customer's web browser on a laptop computer is used to access a web site, such as an ecommerce web site. When the customer types in the website URL, his/her browser sends a request via the internet to a web server, such as can be provided as part of a customer support server according to the invention. The web server processes the request and as part of that process it looks for any previously supplied cookie. If it finds one, it will create a new session for that cookie (a previously defined system). If it does not find a previously supplied cookie, it issues a cookie to the browser and renders the requested page to the customer's browser. Currently available browsers, such as Mozilla, Opera, Internet Explorer, Safari, or Chrome, will by default store this cookie which allows the business to identify the computer or person browsing their website as a unique visitor (the cookie is for the purposes of this invention, a unique identifier) as long as the cookie is present. The cookie or the parameters stored in relation to the cookie (such as a session ID) facilitate tracking of any activities, such as which pages were viewed, for example, by the visitor while navigating the website. While cookies are presently preferred, other persistence methods, such as the use of URL parameters or device fingerprinting, could also be employed.

Figure 7:
FIG. 7 is a diagram showing an illustrative web page as viewed by a customer for use with the system of FIG. 1.

At Step 1, a URL request is made from a web browser 40 on a customer web enabled device 14*n*. The URL request goes through the internet 16 and from there, travels (Step 2) to the ecommerce website server 42, which is preferably co-hosted with the customer support server 20, and includes one or more e-commerce web servers 44. The request is then processed by an ecommerce web server. The ecommerce web server interacts with the database 22*n* and sends back through the internet (Step 3) a text file containing a cookie 46 and the content (e.g., page) corresponding to the URL that was requested by the customer web enabled device. The cookie is a web enabled device unique identifier. The cookie is written to the appropriate database table 48 as a system ID by the ecommerce web server. The cookie is received back (Step 4) by the user web browser and displayed on the web enabled device's screen (e.g., as shown in FIG. 7). The unique identifier is preferably in the form of an anonymous or encrypted code, but it can also include any other suitable sequence, such as the customer's name and address. In some embodiments, the displayed code can be different from the stored cookie value (e.g., it can be a simplified version of the cookie value).

FIG. 3 shows a database table 48 containing web site access data. More specifically, a database table can contain for each access an access time 50, a system ID 52 (unique identifiers of web enabled devices) that accessed the website and a corresponding session ID 54, last access time 56, and IP address 58. This table can include data from many human and/or automated visitors to the site, and currently a lot of the data collected may never be used at all, much less associated with a customer in some way (i.e. no name, or physical address, or email address is associated). Some ecommerce businesses associate some activity with user entered information such as username and password. This allows "Welcome back, User" messages to be presented on some sites. But, many sites do no association of customer info at all.

The unique identifier is used to create a unique system ID. This could be accomplished directly, i.e. the system ID is simply made the unique identifier, or creation could be accomplished indirectly. If the system ID is created indirectly, it is then associated to the unique identifier.

Each visit by the user web enabled device is given a unique session number. Typically a session consists of each visit made to the website so long as there is no period of inactivity that exceeds a definable time period (for example 20 minutes of inactivity). If the user is inactive for greater than the defined inactivity period, then any successive activity by that user would create another web session (another unique session number).

The table in FIG. 3 should generally include a date the session was created, the system ID that generated the session activity, and the session ID at a minimum. There are many other things that could also be included in the table, or put in other tables that are referenced with primary or foreign keys.

FIG. 4 shows detail from a web session log 60 where data pertaining to each unique session is recorded to a table in a database. This data includes web pages viewed 62, the time they were accessed 50, and the session ID 54 that the history belongs to. This table records all page views by all web enabled devices (all systems).

Other data pertaining to each unique session may be databased as well. Examples include any item that is placed in the customer's cart, the IP address of the customer (which can reveal the geographic location of the customer), the date and time of instances of the web browsing activity, and the type of browser which was used to access the site (which can provide info pertaining to the type of device used to access the site).

FIG. 5 shows the relation of a customer identification number 72 to multiple web enabled device unique identifiers (system IDs) 52. Especially with the widespread adoption and use of web enabled mobile phones ("smart phones") in the last couple of years, prospects and customers are utilizing a larger number of web enabled devices to access a given business' website. This customer behavior has created and continues to make more important the growing need for businesses to find a way to track the customer's separate web interactions with a business.

Generally, the customer data is acquired by open prompting of the user. It can be viewed as in-band information that is entered explicitly in response to prompts such as text entry fields on a web site. The web log data can be instead viewed as out-of-band information, and it is not explicitly prompted for.

Figure 6:
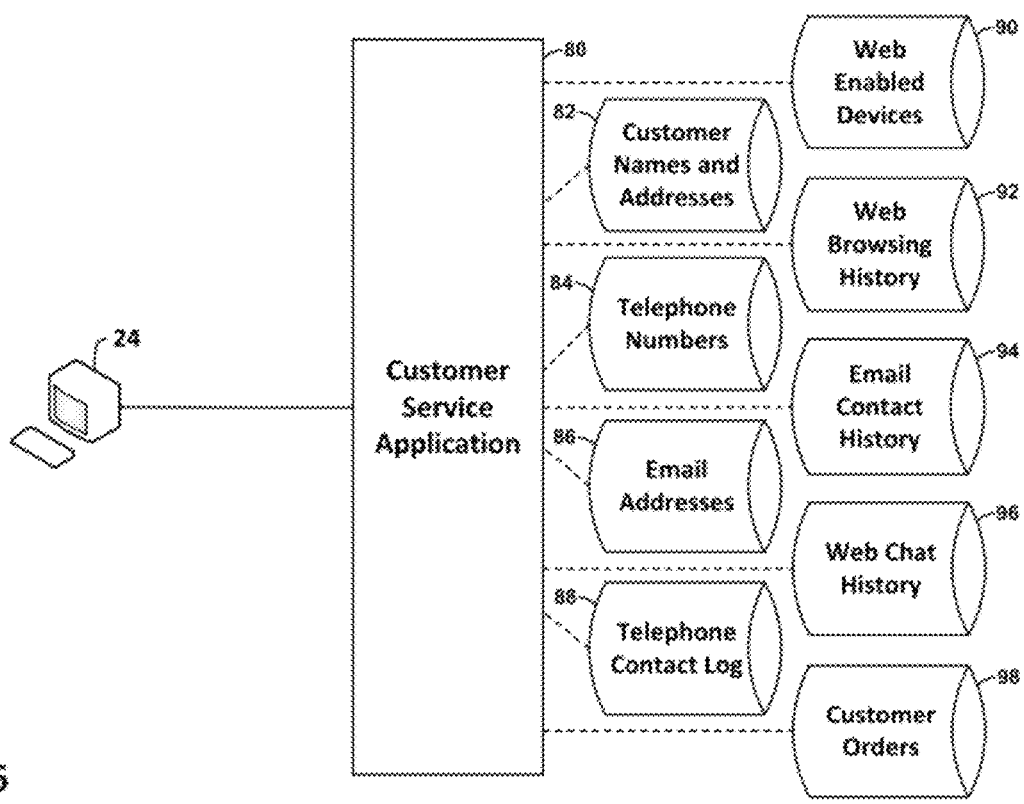
FIG. 6 is a diagram showing storage of customer data and web log data for use with the system of FIG. 1.

FIG. 6 shows representative connections that form the backbone of the customer support server application such as databases (or database tables) containing: customer names and addresses, shipping addresses, telephone numbers, web enabled devices, web browsing history, email addresses, email contact log, telephone contact log, chat log, customer orders, etc. Its purpose is to illustrate the types of data that can be pulled from these databases and database tables and assembled to create the functionality of a customer relationship management (CRM) application.

The customer support server application has access to information contained in databases and database tables. Some examples are:
Customer name and address
  Name
  Household address
  Shipping addresses
Web enabled devices
  Web browsing history
Telephone numbers acquired by the business
  Phone contact history—both outgoing and incoming
Email addresses acquired by the business
  Email contact history—both outgoing and incoming
Web chat history
Prior purchase history:
  order numbers
  order dates
  items purchased
  price paid for each item The exact structure of the database and the selection of fields provided for is application-specific and somewhat subjective. The type of storage needed is also application-specific and can range from simple storage, such as flat files in a directory, to enterprise-scale data warehousing applications. One of ordinary skill in the art would therefore recognize that there are essentially limitless choices in configuring the storage for the customer support system.

Figure 8:
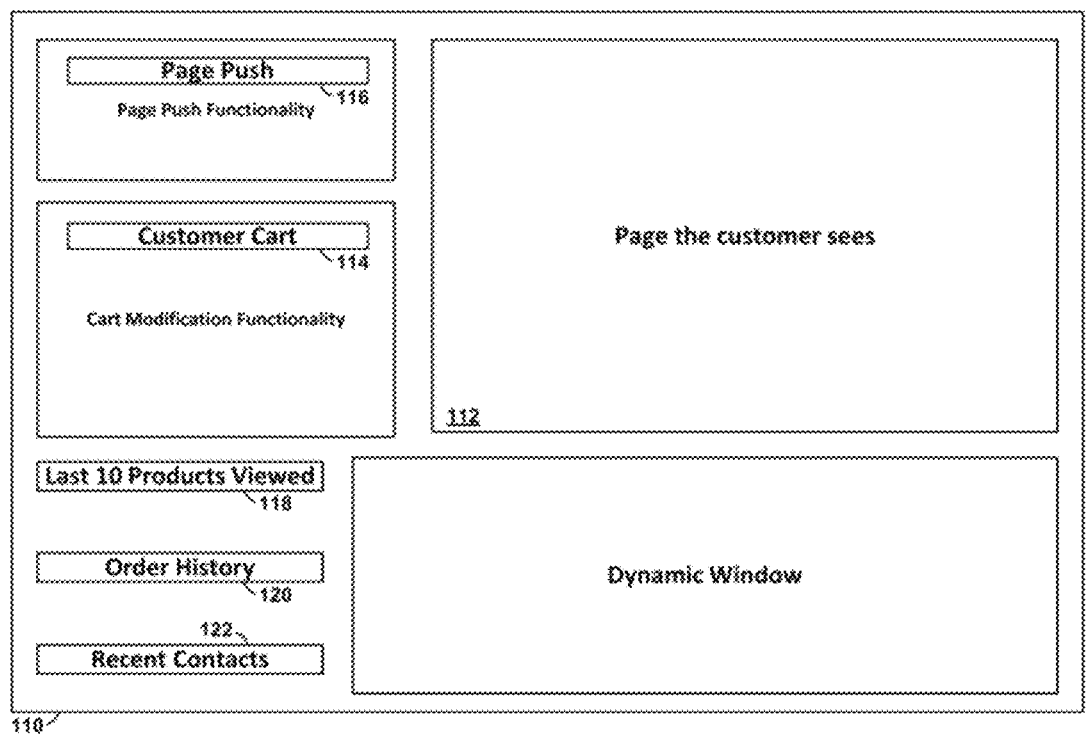
FIG. 8 is a diagram showing an illustrative customer support representative's screen for use with the system of FIG. 1.

Referring to FIG. 8, a contact center support representative's screen 110 on their terminal 24 after loading the web enabled device unique identifier allows the user to access some or all of the following
  A visual of the web page the user's browser is currently displaying 112
  Current cart contents—with display buttons to add/delete items 114
  A "push a new URL onto profile" control, such as a button, which loads a web page placed on a visitor's profile by the contact center support representative 116
  A last 10 products viewed area (or a list of products customer is likely to be interested in) and the date viewed (how fresh the data is) 118
  Access to past order history (can be scanned for customer preferences based on past order history) 120
  Recent contact history, such as previous phone, contact events, customer service logs, and previous web site visit history 122.

The contact center support representative's screen 110 can also provide third party information for review by the representative 30 (see Example 4). This third party information can be received in a number of ways, including being acquired on-the-fly during browsing, retrieved during the call, or retrieved from storage. It may or may not be stored after the call. A wide variety of third party information can be retrieved. For example, approximate physical location can be supplied by third-party commercial services based on IP address alone or credit information can be supplied by credit bureaus. Other types of information could include information from data cooperatives (e.g., Epsilon, i-behavior, Experian) or data exchanges (e.g., Bluekai, 24-7 Media).

EXAMPLE 1

A person shopping online using their work laptop computer finds the business web site through a paid search ad on a search engine such as Google. When he or she accesses the business site, a cookie is placed on his or her laptop by the business website (the functionality described for FIG. 2). A session is recorded in the session table (FIG. 3). The person views several products while on the site during the session. The web pages viewed, including which products were viewed, are recorded to the web session log (FIG. 4). The person decides to provide an email address as the business provides automatic notification via email if there is any change in the price of the product in which the person is interested. The email address is written to the email address database (see FIG. 6). The email address is associated with the system ID.

Three days later, the price of the product goes down from $699.99 to $659.99. An email is sent out by the business to the email address provided by the person. The person sees the email that morning when checking their email with their smart phone. They open the email and click through a link in the email which takes them to the product page on the business website. The business website places a cookie on the browser of the smart phone (functionality from FIG. 2). A session is recorded in the session table (FIG. 3). The email address is now associated with a second cookie, and subsequently, a second system ID (the email address is known simply because the user clicks on a link in the email and visits the business' website—this functionality is well known in the art). The person confirms the price is $659.99 when they view the product page. The product page viewed and any other pages viewed are recorded to the web session log (FIG. 4). The person decides to buy the product at that price. However, they decide to place the order using their tablet pc instead of their smart phone, because data entry on the smart phone is more difficult than on the tablet.

The person types the business website URL into the browser on their tablet, and goes to the website home page. The business website places a cookie on the browser of the tablet (functionality from FIG. 2). The person navigates to the product they are interested in and proceeds to place the order. As is common when placing an order, the person provides their name, billing address, billing address phone number, their cell phone number, and their email address. Each of these pieces of customer information is written to the database and/or database tables. A customer ID is created (FIG. 5), where the name, billing address, billing phone number, cell phone number, and email address are all associated with the person. Additionally, since the email address (same one is used by the customer) is also associated with two other web sessions in the session log table, each with different system IDs, those system IDs are associated with the customer record—the customer ID (FIG. 5). Thus, the web browsing history from the person's work laptop computer is associated with the business' customer record and the web browsing history from the person's smart phone is associated with the business' customer record.

The tracking activity allows a contact center representative to more efficiently help the customer because of the connections facilitated by the invention. For example, suppose the customer were to return to the business website three months later, and he or she has a question about another product. In this situation, the contact center support representatives have the ability to see what the customer is observing on the company website in combination with access to the customer's prior web browsing history and other customer information previously collected and stored in related company databases.

Figure 9:
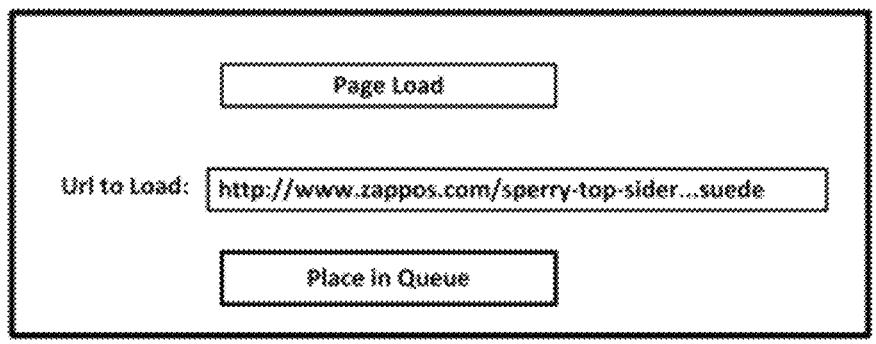
FIG. 9 is a diagram of an illustrative page-push control for the customer support representative's screen of FIG. 1.
Figure 10:
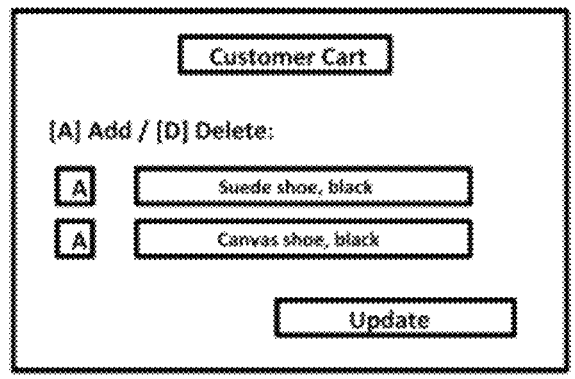
FIG. 10 is a diagram of an illustrative cart modification control for the customer support representative's screen of FIG. 1.

The customer calls the business and a contact center representative takes their telephone call. The representative determines the customer is on the website, such as by asking, and he or she then asks for the ID number (which is the system ID or unique identifier) on the top of the web page (FIG. 7). The customer tells the representative the ID number which the representative punches into their CRM application. The CRM application returns any information currently associated with the system ID (FIG. 9). For example, the representative is able to see the current page the customer is viewing, the fact that a previous order exists for this customer, current cart contents, etc.

With systems according to the invention, representatives, including sales and support staff, can be empowered with information that allows them to leverage this shopping behavior. In this example, a representative sees the product the customer is viewing in their browser. Instead of the customer having to describe the product they have a question about—verbally exchanging descriptive information or a product identification number, in this case the representative simply confirms that he/she can see the product the customer is viewing and asks how they may be of assistance. The customer asks their question and the representative is able to retrieve additional information about the product (through a separate application), without any further customer input, and then answers the customer's question.

Further, suppose the customer determines from the representative's answer to their question that the product is not suitable for their needs. Because the representative has the customer's system ID (unique identifier), the representative has additional functionality pertaining to the invention to leverage.

The system ID is connected to a cart ID (a cart being associated with a single website visitor is well known in the art). Therefore the representative, through the CRM application has a back door (through database connections) to the customer's cart. The representative can add or remove items from the customer's cart.

Continuing the example, the representative determines that the product discussed thus far is not desired by the customer. The representative selects another product which he or she believes to better meet the customer's needs. The representative selects the business web site URL for the product and places it in the CRM application window (FIG. 9). When the representative places the URL in the CRM application and selects "load URL", behind the application, the URL is placed in the customer's web profile. When the customer's refreshes their browser (they are instructed to do so), he/she is taken to the product which was "pushed" by the representative.

The benefit to the customer is to be able to view the product being described by the representative while conversing. The customer can visually confirm points being made by the representative as he/she makes them as to why the product would be a good one to use to solve the customer's need. Confirmation of these points while they are being made is more advantageous than the customer having to confirm after the fact as in after the call has ended.

For the purposes of example, the customer agrees that this product is a better choice. Additionally, this product requires specific cables to be purchased depending upon the product's actual use. The representative discusses the specific use and chooses the appropriate cables to add to the order for the customer. As the customer agrees to each item, the representative:
1. Removes from the customer's cart the product the customer first inquired about.
2. Adds to the customer's cart the alternative product that the customer agreed to buy
3. Adds to the customer's cart the cables or other accessories that are needed for the customer's intended use of the product.

By loading the customer's cart with the items that were discussed, the representative removes from the customer the task of locating the items on the business website and adding them to their cart (either during the conversation, which can lengthen the time the representative needs to spend with the customer on the call, or after the call is over, where the possibility exists that the customer may have difficulty finding the items discussed and therefore may lose interest).

EXAMPLE 2

When a customer contacts a contact center support representative shortly after having placed an order online, currently the representative generally inquires and receive information such as an order number, or a last name and zip code, or a phone number, to find the order or customer in the contact center system and helps the customer.

Leveraging the identification of web enabled devices described in the present invention, any hyperlinked contact (chat or email for example) can automatically pass the unique identifier. A customer, just by clicking the chat link and then asking their question, could be identified and a response immediately given without the need to collect any order or customer related information. In this case, the contact center representative could simply utilize the unique identifier to figure out which related information to retrieve.

With the unique identifier (in this case a cookie, for example) already established, when the customer clicks on chat, the contact center representative has access to all information associated with that cookie, including the information about the order just placed through that web enabled device. When the customer indicates they forgot an item and asks, "can you add the XYZ to my order?", the representative can add the item to the customer's order, get a successful credit card authorization for the additional amount, and then respond back via chat, "Done! I have added XYZ to your order number ###. The new total is $XXX.YY. It will ship tomorrow and be delivered on Thursday or Friday", all without having to ask for any order or customer related information.

EXAMPLE 3

This example illustrates benefits to a caller with a smart phone. Presently, mobile phone websites are generally not very easy to use or feature-rich compared to standard websites. With smart phone callers, therefore, once the contact center representative has the unique identifier, he or she can push pages to the cell phone, which is easier than trying to navigate web site pages using a small cell phone screen.

If the caller is a previous customer, in some circumstances, the representative can also retrieve all information necessary, such as billing address, ship to address, phone number and even encrypted credit card data, from the database to complete the transaction. This example illustrates how simple it can be for the smart phone caller enjoy a good web experience and to place an order.

EXAMPLE 4

A customer calls a contact center of a clothing retailer in the month of December asking about a blouse. The contact center representative asks for and receives the web ID from the customer. With this web ID the contact center representative is shown that the customer lives in Miami, Fla. and has a past history of buying high end clothing in neutral colors from a certain designer. This information allows the representative to show the customer new clothing items from that designer in neutral shades and in the general price range as previous purchases without recommending any items that the customer has purchased or returned in the past. Without this customer information the representative would have to spend time questioning the customer about her taste in clothing and may spend unnecessary time initially suggesting cold season clothing that would not be appropriate for the location of this client. The accessories that the representative recommends to the customer would be preselected based on specific trends of what similar customers have purchased at a high frequency. Since all of the suggestions made by the representative are being simultaneously pushed to the customer's terminal no time is lost in describing the item in words or in guiding the customer to the URLs of the item. As the customer agrees to purchase these items the representative preloads them into the customer's shopping cart thus preventing errors and making it very easy for the customer to complete her purchase. This information therefore would help the representative efficiently and quickly select, recommend and show the best possible solutions to the customer.

EXAMPLE 5

A previous customer browses a retailer's website looking for a pair of dress shoes. Seeing a pair that she likes, she is unable to determine how to utilize a coupon code which she found on the web for 10% off purchases over $100. She calls the contact center and the contact center representative asks for and receives the web ID from the customer. With the connection made by receiving the web ID, the contact center representative is shown this customer's billing and previous shipping addresses, billing and cell phone numbers, and that she is calling from her cell phone, her recent web browsing history including last 10 products viewed in the current web browsing session, and that her current shopping cart is empty.

The customer inquires as to how to utilize the coupon code. Rather than verbally guiding the customer through to the appropriate page of the checkout process, the contact center representative "pushes" the web page that contains the appropriate box so the customer can see for herself. The customer is able to view the page while the contact center representative describes the location of the text box. The customer is pleased to have the question answered in this fashion.

EXAMPLE 6

A customer calls to let a company know that he didn't receive one of the items that was supposed to be in the box.

The representative responds by saying that they would be sure to solve the problem and asks if the customer is online, which he is. The representative then asks for the ID, and, using the ID, pulls up the customer's order history. He then asks which one was missing, and the customer indicates which one it was. The representative, wanting to confirm which part was missing, grabs the item number for the item and puts it into the customer's cart. He then tells the customer to click on the cart link. The customer does so, which brings up the cart page containing the one item. In this particular case the retailer has a small image of the product and a link to that product's web page on the site. The customer can then see the image and click on the link, thus navigating to the product page. After seeing a picture of the product, the customer realizes that the missing part is very small and retrieves the box the shipment came in and finds the item hidden within the packing material.

In one embodiment, the system is based on a Microsoft Windows® -based computer system, but other platforms could be used as well, such as Apple McIntosh®, Linux®, or UNIX®-based platforms. And though the system described is preferably implemented in connection with special-purpose software programs running on general-purpose computer platforms, it could also be implemented in whole or in part using special-purpose hardware. Moreover, while the system can be broken into the series of modules and steps shown for illustration purposes, one of ordinary skill in the art would recognize that it is also possible to combine them and/or split them differently to achieve a different breakdown.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A method of interacting with website users, comprising:
serving product pages from an e-commerce website over a public network during a first web browsing session associated with a first session id,
tracking a first of the users' interactions using a first networked device with website pages served during the first web browsing session, based on a first system id,
storing data received from the first of the users during the first web browsing session in association with the first session id,
serving pages from the website during a second web browsing session associated with a second session id,
tracking the first of the users' interactions using a second networked device with the website pages served during the second web browsing session, based on a second system id,
storing data received from the first of the users during the second web browsing session in association with the second session id,
wherein at least one of the tracking the first of the users' interactions based on a first system id and the tracking the first of the users' interactions based on a second system id is based on an anonymous id,
initiating a first bidirectional verbal telephone communication session through a voice channel between a location of the first of the users and a user support location initiated from the location of the first of the users during one of the web browsing sessions, which takes place over a data channel between the location of the first of the users and the user support location, and wherein the voice channel and the data channel are different channels,
receiving at the user support location one of the first and second system ids corresponding to one of the first and second networked devices from the first of the users during the communication session,
associating the first tracked interactions using the first network device and associated with the first session id with the second tracked interactions using the second network device and associated with the second session id, using data received from the tracked interactions that is common to the first and second interactions,
accessing at the user support location during the bidirectional verbal telephone communication session stored information relating to the first user from both the steps of tracking, based on the first system id and on the second system id
serving product pages from an e-commerce website over a public network during a third web browsing session associated with a third session id,
tracking a second of the users' interactions using a third networked device with website pages served during the third web browsing session, based on a third system id, wherein the first and second users are different,
storing data received from the second user during the third web browsing session in association with the third session id,
serving pages from the website during a fourth web browsing session associated with a fourth session id,
tracking the second of the users' interactions using a fourth networked device with the website pages served during the fourth web browsing session, based on a fourth system id,
storing data received from the second user during the fourth web browsing session in association with the fourth session id,
wherein at least one of the step of tracking the second of the users' interactions based on a third system id and the step of tracking the second of the users' interactions based on a fourth system id is based on an anonymous id,
initiating a second bidirectional verbal telephone communication session through a voice channel between a location of the second of the users and a user support location initiated from the location of the second of the users during one of the third and fourth web browsing sessions, which takes place over a data channel between the location of the second of the users and the user support location, and wherein the voice channel and the data channel are different channels,
receiving at the user support location one of the third and fourth system ids corresponding to one of the third and fourth networked devices from the second of the users during the communication session,
associating the third tracked interactions using the third network device and associated with the third session id with the fourth tracked interactions using the fourth network device and associated with the fourth session id, using data received from the tracked interactions that is common to the third and fourth interactions, wherein the data used to associate the first and second interactions is of a different type from the data used to associate the third and fourth interactions, and accessing at the user support location during the communication session stored information relating to the second user received from both the steps of tracking based on the third system id and on the fourth system id.

2. The method of claim 1 wherein the steps of tracking are performed using a session persistence mechanism combined with associations between session information from the session persistence mechanism and a system.

3. The method of claim 2 wherein the session persistence mechanism employs cookies.

4. The method of claim 1 wherein the step of accessing information relating to the user accesses demographic information.

5. The method of claim 1 further including the step of accessing at the user support location during the bidirectional verbal telephone communication session information received from at least one third party about the user.

6. The method of claim 1 further including the step of loading web content from the user support location on at least one of the website pages during the bidirectional verbal telephone communication session.

7. The method of claim 6 wherein the step of loading includes loading shopping cart content information.

8. The method of claim 1 further including the step of initiating an on-line chat session, and wherein the step of receiving an id occurs when the user engages in an on-line chat session and a machine-readable version of the system id is received.

9. The method of claim 1 further including the steps of:
prompting users for user information;
storing prompted user information received from users in response to the step of prompting in a database for a plurality of users, and
wherein the step of accessing the stored further information includes accessing the stored prompted information.

10. The method of claim 9 wherein the step of prompting users includes prompting at least some users via hypertext data entry controls, prompting at least some users via paper forms, and prompting at least some users via telephone.

11. The method of claim 9 wherein the step of prompting users includes prompting at least some users for registration information.

12. The method of claim 9 wherein the step of prompting users includes prompting at least some users for personal identification information.

13. The method of claim 1 wherein the step of associating associates the first tracked interactions using the first network device with the second tracked interactions using the second network device using an e-mail address received from the tracked interactions that is common to the first and second interactions.

14. The method of claim 1 wherein one of the first and second browsing sessions is the first of the user's first browsing session for the e-commerce website, and wherein one of the third and fourth browsing sessions is the second of the user's first browsing session for the e-commerce website.

15. The method of claim 14 wherein one of the first and second browsing sessions is initiated from a paid advertisement.

16. A system for interacting with website users, comprising:
user web page generation logic including logic operative to load through a data channel for each of a plurality of user browsers including at least a first user browser and a second user browser each at a different user location with:
a plurality of offered product pages,
a system identifier display field with a system identifier,
session persistence management logic operative to track unique sessions for different system identifiers, including system identifiers for a first user and a second user,
user information storage including:
session history storage for storing user history information about a plurality of session history entries for each of the plurality of users, including at least a first user and a second user, wherein the session history entries each include a system identifier entry,
prompted user information storage for storing user information received in response to prompting during an interaction with the first user that occurred separately from the plurality of sessions for the first user, and
prompted user information storage for storing user information received in response to prompting during an interaction with the second user that occurred separately from the plurality of sessions for the second user,
association logic responsive to the session history storage and to the prompted user information storage and operative to create associations between stored information for the first user based on common data received from different interactions with the first user, wherein at least one of the different interactions with the first user is anonymous,
association logic responsive to the session history storage and to the prompted user information storage and operative to create associations between stored information for the second user based on common data received from different interactions with the second user, wherein at least one of the different interactions with the second user is anonymous,
a user support representative terminal at a user support location remote from the user locations comprising:
a system identifier entry tool, operative to receive system identifiers for at least the first and second users,
session history access logic operative to access session history information from the session history storage based on at least a system identifier for the first user and a system identifier for the second user entered with the system identifier entry tool,
user browsing session display logic responsive to the session history access logic for at least the first and second users,
session history information display logic responsive to the session history storage for at least the first and second users, and
stored user information display logic responsive to the user information storage for at least the first and second users,
a first bidirectional telephonic voice communication channel between at least one of the browser locations for the first user and the user support location, and
a second bidirectional telephonic voice communication channel between at least one of the browser locations for the second user and the user support location, wherein the voice channel for the first user and the data channel for the first user are different channels, and wherein the voice channel for the second user and the data channel for the second user are different channels.

17. The apparatus of claim 16 further including logic operative to store in the prompted user information storage user information for at least some users prompted via hypertext data entry controls, for at least some users prompted via paper forms, and for at least some users prompted via telephone.

18. The method of claim 16 further including further steps of prompting and tracking for further users, and wherein the further steps of prompting include prompting via hypertext data entry controls for at least some further users, prompting via paper forms for at least some further users, and prompting via telephone for at least some further users.

19. A method of interacting with website users, comprising:
serving during a first web browsing session through a first data channel a series of web pages selected by a first of the users that include content that belongs to a set of browsable hyperlinked website pages,
tracking the first of the users' interactions with the series of website pages using different web-enabled devices that are each associated with a different system id, wherein at least one of the first users' interactions is anonymous,
associating interactions tracked on the different web-enabled devices by the first user after the step of tracking the first of the users' interactions,
initiating a bidirectional verbal telephone communication session through a first voice channel between a location of the first user and a user support location initiated from the location of the first user during the first web browsing session, wherein the first voice channel and the first data channel are different channels,
receiving at the user support location one of the associated system ids from the first user during the first communication session,
serving custom-selected portions of the content from the set of browsable hyperlinked website pages into the series of web pages in the browsing session for the first user from the user support location under control of a user support representative during the first communication session,
serving during a second web browsing session through a second data channel a series of web pages selected by a second of the users that include content that belongs to a set of browsable hyperlinked website pages,
tracking the second of the users' interactions with the series of website pages using different web-enabled devices that are each associated with a different system id, wherein at least one of the second users' interactions is anonymous,
associating interactions tracked on the different web-enabled devices by the second user after the step of tracking the second of the users' interactions,
initiating a bidirectional verbal telephone communication session through a second voice channel between a location of the second user and a user support location initiated from the location of the second user during the second web browsing session, wherein the second voice channel and the second data channel are different channels,
receiving at the user support location one of the associated system ids from the second user during the second communication session, and
serving custom-selected portions of the content from the set of browsable hyperlinked website pages into the series of web pages in the browsing session for the second user from the user support location under control of a user support representative during the second communication session.

20. The method of claim 19 wherein the step of serving custom-selected content includes loading shopping cart content information into a shopping cart page of the website for the user.

21. The method of claim 19 wherein the step of initiating includes initiating an on-line chat session separate from the website content as the verbal communication session, and wherein the step of receiving an id occurs when the user engages in an on-line chat session and a machine-readable version of the system id is received.

22. The method of claim 19 wherein the step of initiating includes initiating a telephone session as the verbal communication session.

23. The method of claim 19 wherein the step of loading includes loading at least one selected browsable page from the website into the user's browser for viewing.

24. The method of claim 19 wherein the step of loading includes loading a completely custom page into the user's browser for viewing.

25. A method of interacting with website users, comprising:
serving through a first data channel during a first web browsing session a series of web pages selected by a first user that include content that belongs to a set of browsable website pages,
prompting the user for information during an interaction with the first user,
tracking based on a system id the first of the users' interactions with the series of website pages that occurs separately from and before the user's interactions with the series of website pages in which the first user is prompted, wherein the first of the first user's interactions is anonymous, associating information from the step of prompting the first user with information from the step of tracking for the first user in response to the step of prompting for the first user,
initiating a bidirectional verbal telephone communication session through a voice channel between a location of the first user and a user support location initiated from the location of the first user during the first web browsing session, wherein the voice channel and the data channel for the first user are different channels,
accessing at the user support location information about the first of the users from both the step of prompting the first user and information about the first of the users from the step of tracking for the first user,
serving through a second data channel during a second web browsing session a series of web pages selected by a second user that include content that belongs to a set of browsable website pages,
prompting the second user for information during an interaction with the second user,
tracking based on a system id the second of the users' interactions with the series of website pages that occurs separately from and after the user's interactions with the series of website pages in which the second user is prompted, wherein the first of the second user's interactions is anonymous,
associating information from the step of prompting for the second user with information from the step of tracking for the second user in response to the step of prompting,
initiating a bidirectional verbal telephone communication session through a voice channel between a location of the second user and a user support location initiated from the location of the second user during the second web browsing session, wherein the voice channel and the data channel for the second user are different channels, and accessing at the user support location both information about the second of the users from the step of prompting the second user and information about the second of the users from the step of tracking for the second user.

* * * * *